United States Patent [19]

Gold

[11] 3,864,703
[45] Feb. 4, 1975

[54] PHOTOGRAPHIC APPARATUS
[75] Inventor: Nicholas Gold, Arlington, Mass.
[73] Assignee: Polaroid Corporation, Cambridge, Mass.
[22] Filed: June 3, 1974
[21] Appl. No.: 475,627

Related U.S. Application Data
[63] Continuation-in-part of Ser. No. 375,500, July 2, 1973.

[52] U.S. Cl. .................. 354/86, 354/83, 354/301
[51] Int. Cl. ............................................ G03b 17/50
[58] Field of Search .......... 354/83, 84, 85, 86, 297, 354/301, 303, 304

[56] References Cited
UNITED STATES PATENTS

| | | | |
|---|---|---|---|
| 3,416,427 | 12/1968 | Murphy | 354/304 |
| 3,643,565 | 2/1972 | Bellows | 354/84 |
| 3,672,275 | 6/1972 | Johnson | 354/85 |
| 3,673,938 | 7/1972 | Michatek et al. | 354/86 |
| 3,739,701 | 6/1973 | Erlichman | 354/86 |

*Primary Examiner*—Fred L. Braun
*Attorney, Agent, or Firm*—Alfred E. Corrigan

[57] ABSTRACT

Photographic apparatus for use with a film unit of the self-developing type including a chamber for locating a film unit in position for exposure and a pair of rollers mounted adjacent a leading edge of a film unit located in the exposure position. The rollers are adapted to define a longitudinally extending gap which is substantially parallel with the leading edge of the film unit located in the exposure position. Structure is provided for canting the film unit in a first direction as it is advanced from the exposure position, subsequent to exposure, toward the rollers such that the leading edge of the exposed film unit defines an acute angle with the longitudinally extending gap and in a second direction to reestablish the parallelism as the film unit enters the gap.

5 Claims, 6 Drawing Figures

PHOTOGRAPHIC APPARATUS

CROSS REFERENCE TO RELATED APPLICATION

This application is a continuation-in-part of my co-pending application Ser. No. 375,500 filed July 2, 1973.

BACKGROUND OF THE INVENTION

1. Field of the Invention

This invention relates to photographic apparatus of the self-developing type.

2. Description of the Prior Art

Photographic apparatus of the self-developing type are well known in the art and generally include film-advancing apparatus for advancing an exposed film unit out of its exposure position and into engagement with a pair of pressureapplying members, e.g., rollers. The film unit usually includes a pod, or container, of processing composition, e.g., liquid, having a sealed, rearwardly facing discharge end which is parallel with and adjacent to a leading end of the film unit. The rollers are adapted to engage the leading end of the film unit and the pod to generate sufficient pressure within the processing composition to rupture the seal and spread the contents thereof across a photosensitive layer of the exposed film unit to initiate formation of a visible image within the film unit while the film unit is being advanced to a viewing station.

Generally, the film unit is located in position for exposure with its leading edge parallel with the axes of the rollers, and the film-advancing structure is constructed such that it does not change this parallelism while advancing the film unit into a bite defined by the rollers thereby maximizing the area of the photosensitive layer to be covered by the layer of processing composition. However, maintaining this parallelism during movement of the film unit into the bite of the rollers restricts the designer's choice and/or arrangement of the film-advancing structure, e.g., the film-advancing structure may be restricted to one which applies a symmetrical force to the film unit during advancement of the film unit into the bite of the rollers. Therefore, there is a need for a camera of the self-developing type wherein a film unit may be canted as it is moved out of its exposure position without adversely affecting the spread of the processing composition across the photosensitive layer of the film unit as it passes through a pair of pressure-applying members.

SUMMARY OF THE INVENTION

The instant invention relates to photographic apparatus of the self-developing type and, more particularly, to pressure-applying means for spreading a processing composition across an exposed photosensitive layer of a film unit. The pressure-applying means are especially adapted for use with a camera of the type having film-advancing means which apply a force to an exposed film unit along a line which tends to cant or skew the film unit as it is moved out of its exposure position and into engagement with the pressure-applying means. Ordinarily, orienting the film unit in a skewed manner prior to its entry between the pressure-applying means will increase the possibility that the contents of the pod of processing composition located adjacent to the leading edge of the exposed film unit will not be spread over the entire area of the film unit's photosensitive area, thereby resulting in a portion of the photographed scene not being processed into a visible image. For example, if the exposed film unit were canted or skewed as it enters the bite of the pressure-applying means, the processing composition contained within the pod would not only be spread from the leading edge of the film unit towards its trailing edge, but also would have a tendency to move laterally toward one side of the film unit because of the angle between the bite of the pressure-applying means and the discharge end of the pod. Movement of the processing composition toward one side of the film unit and away from the other side of the film unit during front to rear (leading edge to trailing edge) spreading may result in a spread which does not cover the rear corner of the other side of the film unit. However, this problem is substantially obviated by providing the camera with structure for reestablishing the parallelism between the longitudinally extending gap and the leading edge of the film unit before the leading edge of the film unit enters the gap. The angle through which the film unit would be recanted would be substantially the same number of degrees as the film unit is originally canted during its movement out of the exposure position, thereby locating the leading edge of the film unit in parallel with the bite of the pressure-applying means as the film unit moves into engagement therewith. This parallelism is maintained during movement of the exposed film unit between the pressure-applying means thereby maximizing the area of the photosensitive layer covered by the layer of processing composition.

An object of the invention is to provide photographic apparatus for processing a film unit of the self-developing type wherein a leading edge of the film unit is realigned, subsequent to exposure, in parallel with a longitudinally extending gap defined by a pair of pressure-applying members.

Another object of the invention is to provide photographic apparatus of the self-developing type wherein a film unit may be canted in a first and second generally opposite directions after exposure and prior to passage between a pair of pressure-applying members.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
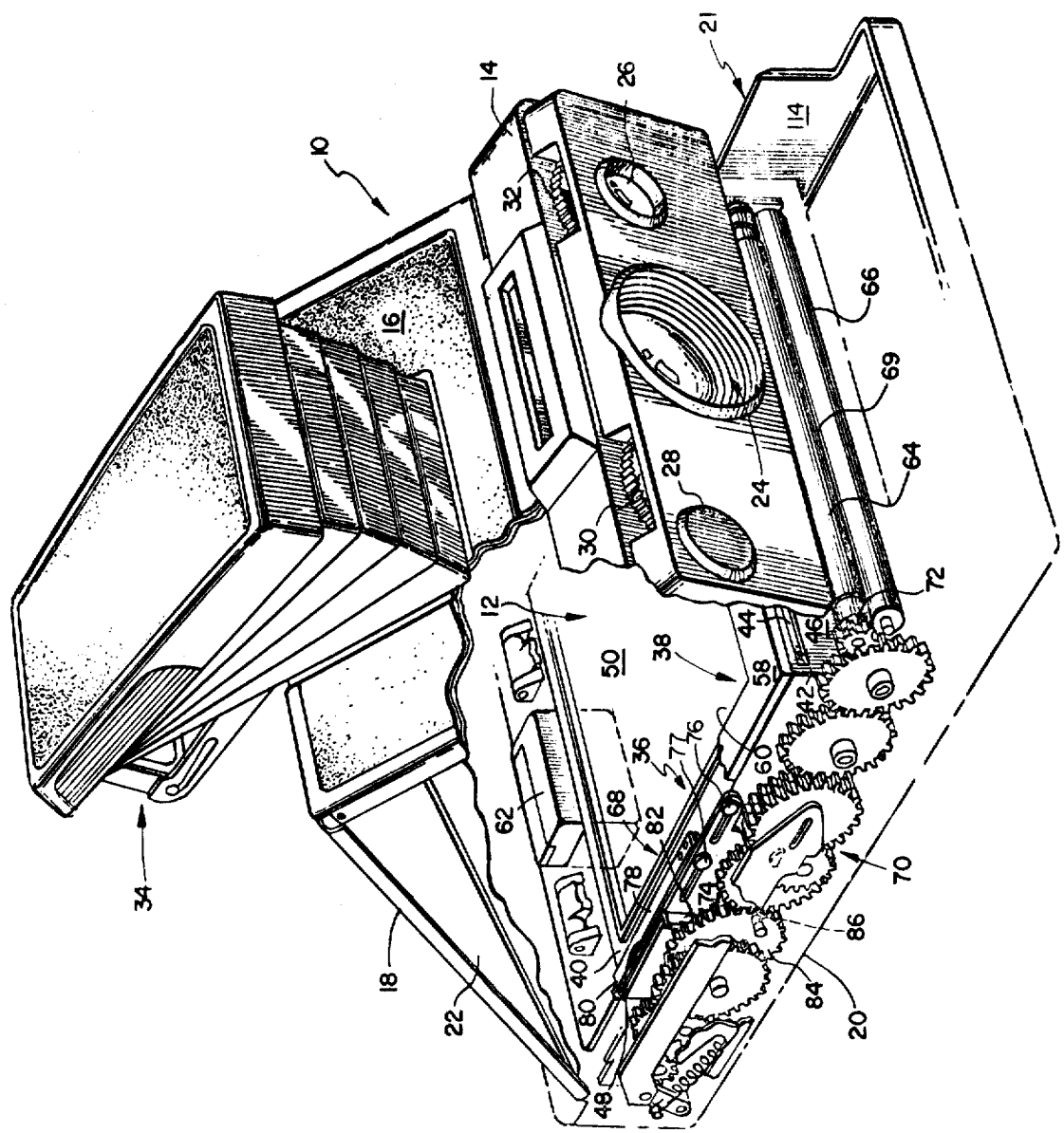
FIG. 1 is a perspective view, partly in section, of photographic apparatus embodying the instant invention.

Reference is now made to FIG. 1 of the drawings wherein is shown photographic apparatus in the form of a camera 10 of the self-developing type. Camera 10 includes an exposure chamber 12 defined by housing sections 14, 16, 18 and 20 and an expansible bellows 22 (only one side being shown). Housing section 14 includes a lens and shutter assembly 24, a photocell 26, an exposure initiating button 28, a focus wheel 30 and a lighten-darken wheel 32. Mounted on top of housing section 16 is a collapsible viewfinder 34. Extending forwardly of and pivotally coupled at 23 to housing section 20 is a roller housing section 21 which is adapted to be pivoted in a clockwise manner so that a film cassette may be loaded into the camera. Housing sections 14, 16, 18 and 20 are pivotally coupled for movement between an extended operative position, as shown in FIG. 1, and a compact folded position, as is more fully described in U.S. Pat. No. 3,678,831.

Exposure chamber 12 is adapted to receive a film cassette 36 having an exposure aperture 38 in a forward wall 40, a resilient member 42 extending part way across an elongated opening 44 located in a leading end wall 46 to prevent the passage of more than one film unit at a time therethrough, and an elongated opening 48 in wall 40 which extends to the rear (to the left as viewed in FIG. 1) of the cassette and part way down a trailing end wall of the cassette. Positioned within the cassette 36 are a plurality of film units 50 (only one being shown) which may be of the type shown in U.S. Pat. No. 3,415,644. Each film unit 50 includes a leading end 52 having a container or pod 54 of processing composition, preferably liquid, attached thereto, superposed image-receiving and photosensitive layers positioned in alignment with opening 38 and a trailing end 56. Pod 54 includes a rearwardly facing discharge end 58 which is parallel with leading end 52. Exposure chamber 12 also includes means in the form of a plate 58 having an opening 60 therein for locating the cassette such that the film unit located closest to the forward wall 40 may be located in position for exposure.

Camera 10 further includes a motor 62 which preferably is powered by a battery located within cassette 36, pressure-applying means, e.g., a pair of rollers 64 and 66, film-advancing means 68 and gearing 70 operatively coupled to motor 62 and to roller 64 via a gear 72 attached thereto. Gearing 70 is also adapted to drive film-advancing means 68. Specifically, film-advancing means 68 includes a generally planar member 74 having elongated slots 76 therein whereby it is attached to suitable camera structure (not shown) by pins 76 for reciprocal motion; a cantilevered arm 78 having a film engaging end 80 which is adapted to extend into opening 48 to engage the trailing end 56 of the film unit 50 located in position for exposure prior to moving it out of cassette 36 via opening 44; and a flange 82. Gearing 70 includes a gear 84 having an inwardly extending pin 86 located on one of its faces. During operation of the camera, gear 84 is rotated in a clockwise manner to move pin 86 into engagement with flange 82 to move the film-advancing means 68 to the right (as viewed in FIG. 1) thereby moving film unit 50 out of its exposure position and into engagement with rollers 64 and 66. Preferably, roller 64 is provided with a pair of flanges 65 and 67 which are adapted to engage the ends of roller 66 to space the main body of roller 64 away from roller 66 to form a longitudinally extending gap 69 (from left to right). For a more detailed description of gearing 70 and its driving relationship to film-advancing means 68, reference is made to U.S. Pat. No. 3,709,122 granted to Blinow et al. on Jan. 9, 1973.

OPERATION

Figure 2:
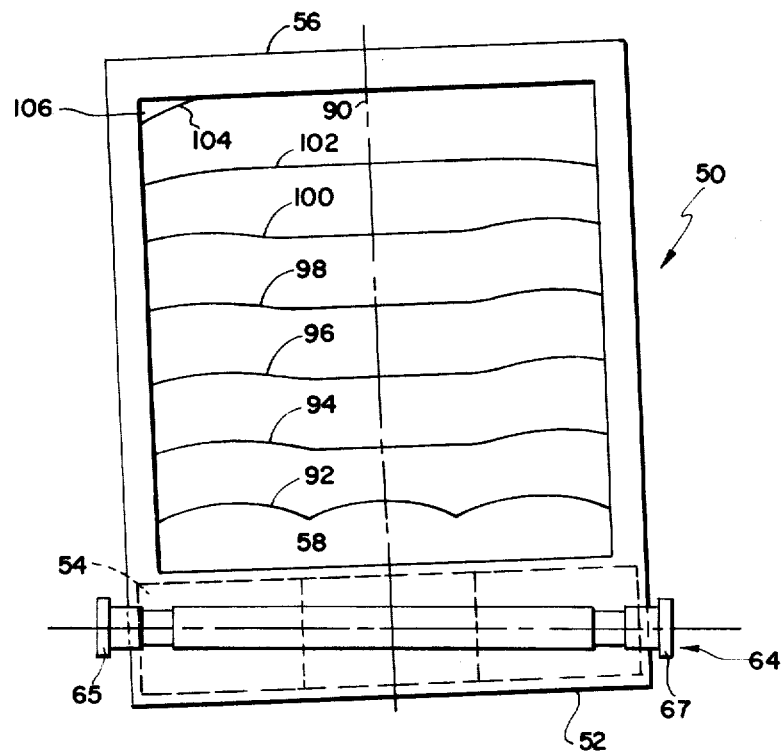
FIG. 2 is a diagrammatic plan view of an exposed film unit in engagement with pressure-applying means.

After the photographer has focused the scene through viewfinder 34, button 28 is depressed to initiate an exposure cycle. Subsequent to exposure of film unit 50, motor 62 is energized to drive rollers 64 and 66 through gearing 70 and gear 72, and to drive the film-advancing means 68, as described above. Actuation of the film-advancing means 68 moves film engaging end 80 into contact with the trailing end 56 of the film unit 50 to move it out of its exposure position and into the bite of the rotating rollers 64 and 66 via opening 44 in cassette 36. It should be noted that the film engaging end 80 engages the film unit on one side of its longitudinal axis, indicated as 90 in FIG. 2. Engaging and moving the film unit in this manner usually results in the film unit being canted as it is being moved out of cassette 36 and into the bite of the rollers. Canting of the film unit is possible because usually its width is slightly less than the width of the interior of cassette 36. As mentioned above, should this canting or skewing of the film unit take place in a conventional camera wherein the axes of the rollers are parallel with the leading end 52 of the film unit before it is moved out of its exposure position, a spread pattern similar to that diagrammatically illustrated in FIG. 2 by lines 92, 94, 96, 98, 100, 102 and 104 may be produced. These lines represent progressive stages of the advancing edge of the processing composition during spreading of the composition. For example, where pod 54 is comprised of three compartments, as shown in FIG. 2, initial rupturing of the pod 54 by rollers 64 and 66 presents an advancing wave front as shown at 92. As the film unit continues its movement through the rollers 64 and 66, the major portion of the wave front progressively flattens out while the left side, as viewed in FIG. 2, of the wave trails behind, as shown from 98 through 104. However, as mentioned above, the processing composition is not only spread from the leading end of the film unit to its trailing end 56, but also from the left side of the film unit to the right side, i.e., there is a lateral movement of the processing composition toward the right side of the film unit. This lateral movement of the processing composition may be caused by a lateral force component created as a result of the acute angle between a line containing the discharge end 58 of the pod 54, which is perpendicular to the longitudinal axis 90, and a plane containing the longitudinal axes of the rollers 64 and 66. Since the rollers are adapted to define a longitudinally extending gap 69 (from left to right as viewed in FIGS. 1-3) when a film unit is located therebetween and since the discharge end 58 is parallel with the leading end 52 of film unit 50, it is also true that the last-mentioned acute angle is also defined by the longitudinally extending gap 69 and the leading end 52 of the film unit 50. Lateral movement of the processing composition to the right may result in the left side of the wave receding relative to the remainder of the wave front until you reach a condition as shown at 104 where substantially the entire photosensitive area of the film unit has been covered by the processing composition except for area 106. In other words, it appears that the amount of processing composition originally provided in pod 54 for covering the left side of the film unit is gradually reduced by the left-to-right lateral movement of the processing composition, thereby resulting in the processing composition on the left side of the film unit being depleted before the corner area 106 of the photosensitive layer of the film unit has been covered by the processing composition. Obviously, this type of a spread will not produce a visible image in area 106.

The present invention substantially obviates this spreading problem by providing roller housing section 21 with means for recanting the advancing film unit such that its leading edge 52 is substantially parallel with the longitudinally extending gap 69. Specifically, a cam 110 having a camming surface 112 is suitably mounted on a side wall 114 of the roller housing section 21 in position to be engaged by the leading edge of the advancing film unit.

Figure 4:
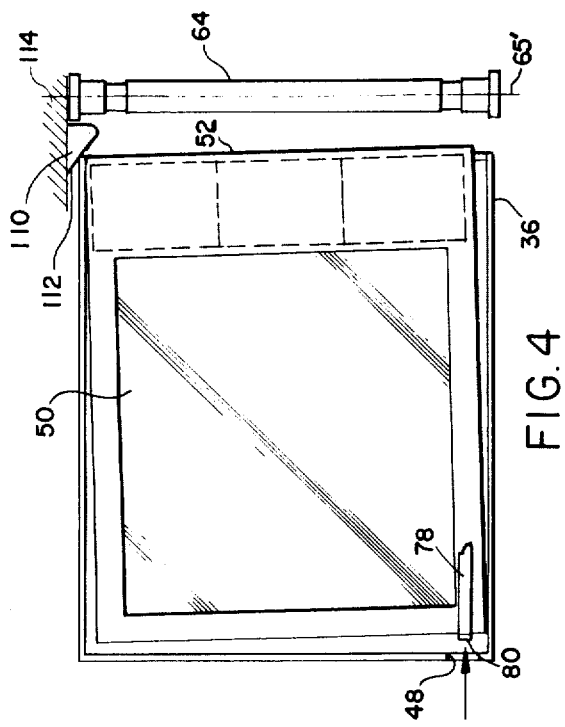
FIG. 4 is a view similar to FIG. 3 showing the film unit in a canted orientation as it is moved out of its exposure position.
Figure 6:
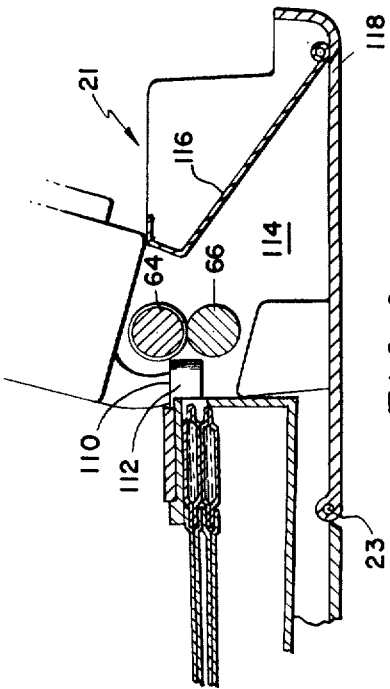
FIG. 6 is a fragmentary diagrammatic end view of the instant invention.
Figure 3:
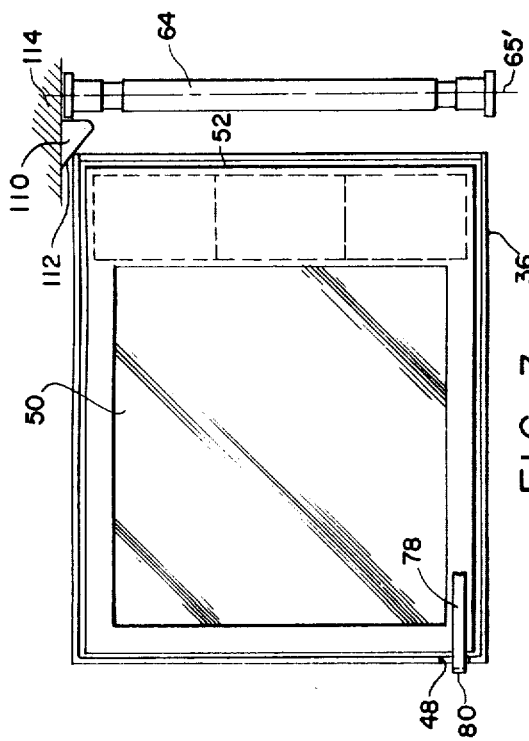
FIG. 3 is a diagrammatic plan view of a film unit located in position for exposure.
Figure 5:
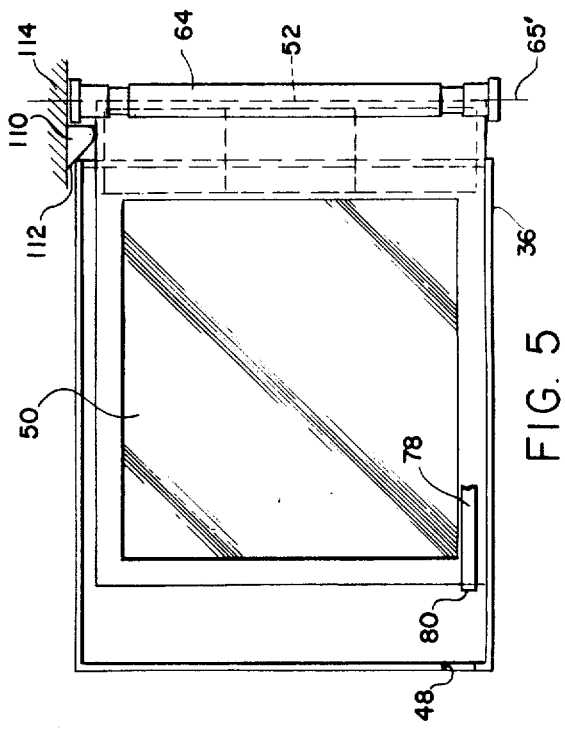
FIG. 5 is a view similar to FIGS. 3 and 4 showing the relationship between the film unit and the pressureapplying means as the former is about to engage the latter.

As shown in FIG. 3, the leading edge 52 of the film unit 50 located in position for exposure is substantially parallel with the axis 65' of roller 64. After exposure, arm 78 is reciprocated to bring film engaging end 80 into engagement with the trailing end 56 of the film unit. As the film engaging end 80 moves the film unit out of its exposure position and toward rollers 64 and 66, the film unit is canted in a counterclockwise manner, due in part to the asymmetrical force being applied to the film unit by the end 80, as shown in FIG. 4. As the film unit is advanced past the position shown in FIG. 4, the leading edge 52 of the film unit engages the camming surface 112 of cam 110. This engagement, together with the advancing force being provided by film engaging end 80, results in a recanting of the film unit until its leading end 52 is substantially parallel with the axes of rollers 64 and 66, as shown in FIG. 5. Substantially immediately after the parallelism has been reestablished, the film unit enters into engagement with the rollers. The rollers continue the advancement of the film unit to the exterior of the camera, via a deflecting plate 116 and exit opening 118, while simultaneously spreading the processing composition across the entire photosensitive layer of the film unit.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for use with a film unit having leading and trailing edges separated by a substantially rectangular viewing area comprising:
   means for locating the film unit in position for exposure;
   pressure-applying means adapted to define a longitudinally extending gap through which the film unit is adapted to be advanced, subsequent to exposure, to spread a processing composition across a photosensitive layer of the film unit;
   means for mounting said pressure-applying means with said longitudinally extending gap and the leading edge of the film unit being parallel with each other;
   means for canting the film unit as it is advanced from said exposure position toward said pressure-applying means such that the leading edge of the film unit defines an acute angle with said longitudinally extending gap; and
   means for recanting the film unit such that its leading edge is substantially parallel with said longitudinally extending gap prior to moving into said gap, whereby the processing composition is spread over an area substantially coextensive with the viewing area.

2. Photographic apparatus as defined in claim 1 further including means for mounting said canting means in position to engage the film unit and move it out of said exposure position and into engagement with said recanting means and said pressure-applying means.

3. Photographic apparatus as defined in claim 2 wherein said pressure-applying means includes at least one roller and said photographic apparatus further includes drive means operatively coupled to said one roller and said canting means whereby said one roller is rotating when said canting means moves the film unit into engagement with said one roller.

4. Photographic apparatus as defined in claim 1 wherein said recanting means includes cam means.

5. Photographic apparatus as defined in claim 4 further including means for mounting said cam means for movement between a first position out of the path of travel of the film unit as it is advanced from its exposure position to said pressure-applying means and a second position in the path of travel of the film unit.

* * * * *